March 9, 1926.
C. A. RASCO
1,576,067
AUXILIARY ROAD SPRING
Filed Jan. 5, 1925
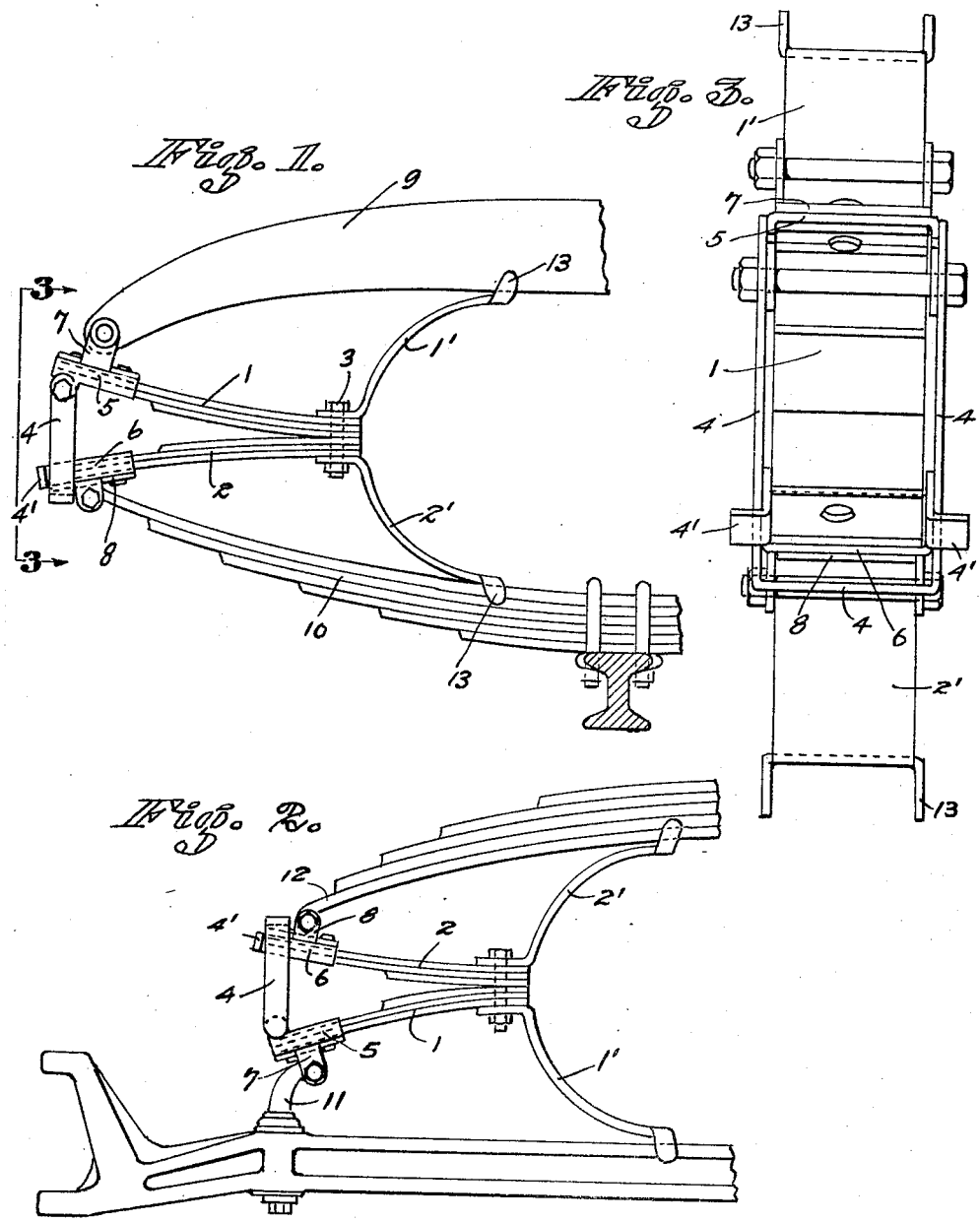
INVENTOR.
CHARLES A. RASCO
BY
ATTORNEYS.

Patented Mar. 9, 1926.

1,576,067

UNITED STATES PATENT OFFICE.

CHARLES ALPHAUS RASCO, OF SAMOA, CALIFORNIA.

AUXILIARY ROAD SPRING.

Application filed January 5, 1925. Serial No. 611.

*To all whom it may concern:*

Be it known that I, CHARLES ALPHAUS RASCO, a citizen of the United States, and a resident of Samoa, in the county of Humboldt and State of California, have invented a new and useful Auxiliary Road Spring, of which the following is a specification.

This invention relates to vehicle spring suspension and particularly to automobiles having leaf springs of the elliptic or semi-elliptic type.

The objects of my invention are to provide an auxiliary spring which may be easily attached to the main road spring and which will modify the action of the same to steady its action.

In the drawings hereto:

Figure 1 shows my auxiliary spring as applied to one end of a conventional automobile spring suspension.

Figure 2 shows its application to the front spring of a Ford automobile, and

Figure 3 is an enlarged end view showing the relation of the various parts.

With reference to the drawing, my device comprises two sets 1 and 2 of leaf springs securely bolted together at one end at 3 and the sets curving divergingly at the opposite end.

The diverging ends are retained in compression against undue divergence by a yoke 4 pivoted to an eared plate 5 secured to the uppermost leaf of the upper group and straddling a similar plate 6 secured to the lowermost plate of the lower group.

Both eared plates have edges turned at right angles slidably positioning the other plates of their groups and on the outer sides of both eared plates 5 and 6 are secured, respectively, other eared plates 7 and 8 for pivotally bolting respectively to the end of the chassis frame 9 of the vehicle and to the end of the existing road spring 10 of the same as shown in Figure 1, or on a Ford automobile as shown in Figure 2 to the spring perch 11 of the axle (in case of the rear axle the usual lug provided) and the end 12 of the transversely arranged road spring, one of the devices being used on each end of the spring.

The eared plate 6 at the free end of the yoke 4 has its extreme ends 4' bent outwardly at right angles to retain the yoke in place yet give it plenty of freedom for oscillation as well as sliding movement.

Extending from the secured ends of the two sets of spring leaves are two or more additional leaves 1' and 2' bent outwardly to resiliently engage the frame and road spring of the vehicle as shown to steady the device and hold it centralized. Lugs 13 on the ends of the leaves 1' and 2' being provided to slidingly engage opposite sides of the spring and frame to prevent lateral displacement of the device.

In operation the two sets of blades rock together in flexing and the rebound is limited by the yoke.

I am aware of many attempts to improve the ordinary vehicle spring suspension by such auxiliary springs but do not know of any having the specific construction of mine as above described which has been found in practice to contribute greatly to the riding qualities of a vehicle without introducing lateral weakness in the suspension as often found with such devices.

I claim:

1. An auxiliary spring for the spring suspension of a vehicle comprising two sets of spring leaves secured together at one end and diverging at their free ends, the free ends being adapted for pivotally securing to opposed members of the existing spring suspension, a yoke over the free end adapted to limit the divergence but permitting approach thereof, the said yoke being pivoted to one set of spring leaves, the other set of spring leaves having eared means for holding said springs in operative relation to the yoke.

2. An auxiliary spring for the spring suspension of a vehicle comprising two sets of spring leaves secured together at one end and diverging at their free ends, the free ends being adapted for pivotally securing to opposed members of the existing spring suspension, and a yoke over the free end adapted to limit the divergence but permitting approach thereof, and a pair of diverging spring leaves extending from the secured ends of the leaves and adapted to engage respectively the opposed members at a point remote from the pivotal securing of the device thereto.

3. An auxiliary spring for the spring suspension of a vehicle comprising two sets of spring leaves secured together at one end and diverging at their free ends, the free ends being adapted for pivotally securing to opposed members of the existing spring suspension, and a pair of diverging spring leaves extending from the secured ends of the leaves adapted to engage respectively the opposed members at a point remote from the pivotal securing of the device thereto.

4. An auxiliary spring for the spring suspension of a vehicle comprising a pair of spring leaves secured together at one end and diverging at the other end, means at the free ends for pivotally securing the leaves to opposed members of the existing spring suspension, and a pair of leaves divergingly extending from the secured ends adapted to resiliently engage respectively said members.

CHARLES ALPHAUS RASCO.